US007843471B2

(12) United States Patent
Doan et al.

(10) Patent No.: US 7,843,471 B2
(45) Date of Patent: Nov. 30, 2010

(54) PERSISTENT AUTHENTICATING MECHANISM TO MAP REAL WORLD OBJECT PRESENCE INTO VIRTUAL WORLD OBJECT AWARENESS

(75) Inventors: Christopher H. Doan, Austin, TX (US); Praveen P. Hirsave, Austin, TX (US); Leonel Saenz, III, Austin, TX (US); Alvin J. Seippel, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 11/372,327

(22) Filed: Mar. 9, 2006

(65) Prior Publication Data

US 2007/0211047 A1     Sep. 13, 2007

(51) Int. Cl.
*G09G 5/00* (2006.01)
(52) U.S. Cl. ................. 345/633; 345/418; 345/619; 345/629; 345/632
(58) Field of Classification Search ................. 345/418, 345/619, 629, 632, 633; 463/1–69
See application file for complete search history.

(56) References Cited

U.S. PATENT DOCUMENTS

| | | | | |
|---|---|---|---|---|
| 5,853,327 | A * | 12/1998 | Gilboa | 463/39 |
| 5,953,686 | A * | 9/1999 | Piernot et al. | 702/150 |
| 6,165,068 | A * | 12/2000 | Sonoda et al. | 463/8 |
| 6,167,353 | A * | 12/2000 | Piernot et al. | 702/94 |
| 6,190,174 | B1 * | 2/2001 | Lam | 434/169 |
| 6,460,851 | B1 * | 10/2002 | Lee et al. | 273/238 |
| 6,690,156 | B1 * | 2/2004 | Weiner et al. | 324/207.17 |
| 6,761,634 | B1 | 7/2004 | Peterson et al. | |
| 6,835,131 | B1 * | 12/2004 | White et al. | 463/1 |
| 7,081,033 | B1 * | 7/2006 | Mawle et al. | 446/175 |
| 7,397,464 | B1 * | 7/2008 | Robbins et al. | 345/173 |
| 2002/0090985 | A1 * | 7/2002 | Tochner et al. | 463/1 |
| 2002/0185532 | A1 | 12/2002 | Berquist et al. | |
| 2003/0134679 | A1 | 7/2003 | Siegel et al. | |
| 2003/0171984 | A1 | 9/2003 | Wodka et al. | |
| 2004/0111335 | A1 | 6/2004 | Black et al. | |

(Continued)

FOREIGN PATENT DOCUMENTS

JP    2004-337502    12/2004

(Continued)

*Primary Examiner*—Xiao M Wu
*Assistant Examiner*—Abderrahim Merouan
(74) *Attorney, Agent, or Firm*—Stephen J. Walder, Jr.; Jeffery S. LaBaw

(57) ABSTRACT

A persistent authenticating mechanism to map real world object presence into virtual world object awareness are provided. The illustrative embodiments provide a mechanism by which the presence of a real world object is detected and, while the real world object's presence continues to be detected, it is made available for use in a virtual environment. The detection of the real world object provides an identifier of the object which is correlated with information regarding how to represent the object in the virtual environment, how the object may be utilized in relation to other objects in the virtual environment such that the real world object is modeled in the virtual environment, and the like. The detection of multiple real world objects may be performed and identification of each of the multiple objects may be used to determine how these objects may be utilized together in the virtual environment.

19 Claims, 8 Drawing Sheets

U.S. PATENT DOCUMENTS

| | | |
|---|---|---|
| 2004/0127277 A1 | 7/2004 | Walker et al. |
| 2004/0145474 A1 | 7/2004 | Schmidtberg et al. |
| 2005/0069171 A1 | 3/2005 | Rhoads et al. |
| 2005/0099268 A1 | 5/2005 | Juels et al. |
| 2005/0174236 A1 | 8/2005 | Brookner |
| 2005/0199723 A1 | 9/2005 | Lubow |
| 2005/0219204 A1 | 10/2005 | Huddleston et al. |
| 2005/0237194 A1 | 10/2005 | VoBa |
| 2005/0239546 A1 | 10/2005 | Hedrick et al. |
| 2005/0245302 A1* | 11/2005 | Bathiche et al. ............... 463/1 |
| 2005/0289590 A1* | 12/2005 | Cheok et al. ................. 725/37 |

FOREIGN PATENT DOCUMENTS

| WO | WO 99/31569 | 6/1999 |
|---|---|---|

* cited by examiner

PERSISTENT AUTHENTICATING MECHANISM TO MAP REAL WORLD OBJECT PRESENCE INTO VIRTUAL WORLD OBJECT AWARENESS

BACKGROUND

1. Technical Field

The present application relates generally to an improved data processing system and method. More specifically, the present application is directed to a persistent authenticating system and method to map real world object presence into virtual world object awareness.

2. Description of Related Art

The ability to scan objects for a particular identification signature of the object is generally known in the art. For example, the use of barcodes, dot codes, radio frequency identifier (RFID) tags, and the like, to provide an identification of an object associated with these scannable identifier devices is generally known in the art. The use of such devices, such as the RFID tags, is only expected to increase in the near future.

One application of scannable identification devices is the use of dot codes on scannable trading cards. For example, the use of dot codes is represented by the E-READER™ plug-in device for the Nintendo GameBoy™ portable gaming system. With the E-READER™, dot codes may be provided on trading cards that, when scanned by the E-READER™ plug-in device unlock special features in software including mini-games, card statistics and data, special items, and the like. Once the trading card is scanned, the special features are unlocked and the trading card need not be present for the unlocked features to be utilized. In fact, the E-READER™ and GameBoy™ system may be turned off and the unlocked features may again be accessed when the system is turned back on due to a storage in the E-READER™ device.

While the trading cards and the E-READER™ device provide a mechanism for unlocking features of computer software, the unlocked features do not represent real-world items that are present at the location of the E-READER™ device. Moreover, the unlocked features do not represent how to use such a real-world item, how the real-world item's usage is persisted, or the like, so that the real-world item may be accurately modeled and integrated into the computer software. To the contrary, the trading cards used with the E-READER™ device merely serve as a recordable medium upon which the dot-codes are recorded so that they may be read by the E-READER™ device.

SUMMARY

The illustrative embodiments provide a persistent authenticating system and method to map real world object presence into virtual world object awareness. More specifically, the illustrative embodiments provide a mechanism by which the presence of a real world object is detected and, while the real world object's presence is continued to be detected, it is made available for use in a virtual world environment. Moreover, the detection of the presence of the real world object provides an identifier of the object which may be correlated with information regarding how to represent the real world object in the virtual world environment, how the object may be utilized in relation to other objects in the virtual world environment such that the real world object is modeled in the virtual world environment, and the like. Furthermore, the detection of multiple real world objects may be performed and identification of each of the multiple real world objects may be used to determine how these real world objects may be utilized together in the virtual world environment.

One significant application of the illustrative embodiments described herein is to the field of computer gaming. Moreover, within the field of computer gaming, the illustrative embodiments are especially well suited for use with persistent virtual world type computer games. While the illustrative embodiments will be described in terms of computer games and persistent virtual world computer games, it should be appreciated that the illustrative embodiments are not limited to being applicable to only computer games. To the contrary, the illustrative embodiments may be used with any application in which real world objects may be rendered as virtual objects in a virtual environment.

In one illustrative embodiment, a computing device having an associated detection mechanism, such as a detection pad upon which real world objects may be placed, is provided. The computing device executes operations for monitoring the detection pad to detect when one or more real world objects are placed on the detection pad or within a detection area of the detection pad. The operations may continue to monitor the detection pad continuously or periodically to determine a current set of one or more real world objects that are within the detection area of the detection pad and compare the current set of real world objects to a previously detected set of real world objects to determine which objects have persistent presence and which objects are no longer within the detection area. Only real world objects that are present within the detection area of the detection pad may be modeled and represented in the virtual world environment. Thus, when a real world object is removed from the detection area of the detection pad, the object's representation in the virtual world environment is removed. In this way, the persistent presence of a real world object as detected by the detection pad is mapped into a virtual world object awareness.

The real world objects preferably are objects that are to be represented by similar virtual objects that are modeled in a virtual world environment within the computing device. For example, the real world objects may be toys, e.g., action figures, toy vehicles, and the like, toy accessories, e.g., toy weapons, toy armor, and the like, clothing items, household items, pieces of a product for assembly, or any other type of objects that may be represented as virtual objects in the virtual world environment and used within the virtual world environment. When the real world object is present within the detection area of the detection pad, the real world object, e.g., the action figure, toy vehicle, toy weapon, etc., is represented in the virtual world in such a manner that is consistent with the usage of the object in the real world.

For example, if the real world object is a toy representation of a sword, the detection of the toy sword in the detection area of the detection pad causes a corresponding virtual sword to be represented in the virtual world environment. Moreover, the virtual sword is represented in the virtual environment in a manner consistent with the usage of a sword in the real world. Thus, if a user's virtual world avatar currently is involved in a combat situation, the virtual sword may be represented as being in a free hand of the avatar. If the user's virtual world avatar is currently not involved in combat, the virtual sword may be represented as being sheathed and hanging on the side of the user's avatar.

The representation of the virtual sword in the virtual world environment may be maintained as long as the toy sword is detected as being present in the detection area of the detection pad. If the user were to remove the toy sword from the detection area of the detection pad, when the absence of the toy sword is detected by the detection pad, the virtual world representation of the toy sword is discontinued.

As mentioned above, the detection pad may detect multiple real world objects as being present within the detection area of the detection pad. The identification of the various real world objects in the detection area is used to retrieve information regarding the real world objects and how to represent the real world objects as virtual objects in a virtual world environment. As part of the determination as to how to represent the real world objects as virtual objects in the virtual world environment, the interaction between the identified real world objects may be determined using a rules database.

For example, assume that the real world objects on a detection pad comprise an action figure representing a knight and accessory objects that comprise a toy sword, a toy helmet, and a toy shield. Information corresponding to each of these detected items may be retrieved from a database associated with an application running in the computer system. This information includes an identification of how each item is utilized in the real world and how such usage is mapped to the virtual world environment. For example, the toy sword is used in the hand of an action figure as a weapon and has certain attack and defense characteristics. As a result, when representing the toy sword in conjunction with the action figure as virtual objects in the virtual world environment, a virtual object corresponding to the toy sword may be represented in the hand or sheath of an avatar resembling the action figure that is present on the detection pad. Similarly, the toy shield, may be represented as a virtual shield object in a hand of the virtual action figure, i.e. the avatar, or on the back of the virtual action figure in the virtual world environment. The toy helmet is used on the head of the action figure and thus, is represented in the virtual world environment as a helmet object placed on the head of the virtual action figure. Thus, the proper interaction of the detected real world objects in the detection area of the detection pad is automatically determined and used to represent the real world objects as virtual objects in a manner consistent with the way in which these real world objects interact with each other in the real world.

Furthermore, the operations in the computing device may monitor a condition of the virtual world object representation of the real world object within the virtual world environment and, based on the condition of the virtual world object representation of the real world object, may disable the user's ability to use the real world object to generate a virtual world representation of the real world object. For example, if the real world object were a toy sword and the user, in a previous session in the virtual world environment, performed actions that resulted in his/her avatar's virtual sword, which corresponds to then real world toy sword, being damaged or broken, then the user's ability to place the toy sword on the detection pad and have a corresponding sword represented in the virtual world environment may be discontinued until the user performs appropriate actions in the virtual world environment, e.g., repairs the virtual representation of the sword in the virtual world environment.

Alternatively, a persistent state of the virtual representation of the real world object may be maintained in the virtual world environment such that each time a real world object is placed in the detection area of the detection pad, the persistent state of the virtual object corresponding to that real world object may be retrieved and used to render the virtual object in the virtual world environment. For example, using the damaged sword example discussed above, rather than discontinuing the ability of the user to generate a virtual object corresponding to the real world toy sword object on the detection pad, the previous state of the virtual sword may be retrieved and used to render the virtual sword representation of the real world toy sword. Thus, if a user, during a previous session in the virtual world environment, damages his virtual sword but fails to repair it, when the user next places the real world toy sword on the detection pad, the virtual sword object rendered in response to detecting the real world toy sword will be rendered as having the same damaged state as when the user last used that real world toy sword object with the virtual world environment.

Additionally, the detection pad may define a grid array that allows for the ability to associate coordinates with items placed within the detection field. Furthermore, it is possible to activate, highlight, etc. specific patterns of the grid to indicate active sensor regions, relevant to the specific virtual world environment, in which real world objects may be placed and their presence detected using the mechanisms of the illustrative embodiments. For example, a human pattern may be highlighted or outlined for an adventure or role playing game virtual world environment. For a trading card based game, card placement blocks may be highlighted/activated, signifying different play areas in which real world objects may be placed.

The size of the detection pad is not limited by the illustrative embodiments described herein. To the contrary, the size of the detection pad may be determined based on the particular implementation and intended use of the detection pad. For example, if the detection pad will be used primarily with a strategy game virtual world environment, in which a large number of pieces may be placed on a large game board, the game pad may be large enough to cover a typical dining room table or coffee table. On the other hand, if the detection pad is to be used with a card game virtual environment, then the detection pad may be quite small in size relative to a dining room table or coffee table.

As a non-gaming related example, using the highlighting/activation of grid patterns or locations on the detection pad described above may be exemplified in a parts list for products requiring assembly. For example a product may be purchased that requires assembly. The pieces of the product may have identifier tags embedded or otherwise attached to them, and may be deposited on the presence detection pad. An assembly program with which the detection pad interfaces may be run on an associated computing device and, for each step of the assembly instructions, the grid location corresponding to the component to be assembled/used next in the series of assembly steps may be highlighted. The assembly program may detect the presence of the pieces via the detection pad and represent the pieces in a virtual world environment in which the various steps for assembly of the product are virtually represented. Moreover, the assembly program may perform a check of the complete inventory of items against the assembly program before assembly begins to ensure that all the necessary pieces are present.

In a further illustrative embodiment, images and/or topological information may be overlaid on the detection pad surface to convey detail that enhances the application program. For example, in addition to highlighting/activating portions of the detection pad based on the particular programs with which the detection pad interfaces, images may be displayed within these highlighted/activated areas that depict the types of real world objects that should be placed in these highlighted/activated areas.

In one illustrative embodiment, a method, in a data processing system, for rendering virtual world objects based on a detected presence of a real world object is provided. The method may comprise detecting a presence of a real world object within a detection area of a detection device and generating, in response to detecting the presence of the real world object, a virtual object in a virtual world environment rendered in the data processing system. The virtual object may correspond to the real world object and may be rendered in the virtual world environment only while the presence of the real world object continues to be detected within the detection area of the detection device. The detection device may be a detection pad having one or more detectors integrated therein and upon which real world objects may be placed. The real world object may be a toy and the virtual world environment may be a virtual computer gaming environment, for example.

The method may detect the presence of the real world object by detecting an identifier mechanism associated with the real world object. The he identifier mechanism may have associated identifier information. The identifier information may be correlated with virtual object characteristic information identifying a manner by which to represent the real world object in the virtual world environment. The virtual object characteristic information may comprise at least one of information identifying how the virtual object may be utilized in relation to other virtual objects in the virtual world environment such that the real world object is modeled in the virtual world environment, or characteristics of the virtual object with regard to particular applications in which the virtual object will be used in the virtual world environment. The identifier mechanism may be either affixed to or integrated with the real world object.

In one illustrative embodiment, the identifier mechanism may be a radio frequency identification (RFID) mechanism. The detection mechanism thus, may comprise one or more RFID detectors.

The method may further comprise monitoring a condition of the virtual object corresponding to the detected real world object within the virtual world environment. The virtual object condition information identifying the condition of the virtual object may be stored in association with the identifier of the real world object. Correlating the identifier information associated with the detected identifier mechanism with virtual object characteristic information may further comprise retrieving the virtual object condition information corresponding to the identifier information and rendering the virtual object corresponding to the identifier information such that the virtual object has a condition corresponding to the virtual object condition information. Rendering the virtual object corresponding to the identifier information such that the virtual object has a condition corresponding to the virtual object condition information may comprise disabling rendering of the virtual object corresponding to the identifier information if the condition meets a predetermined criteria.

The method may further comprise detecting removal of the real world object from the detection area of the detection mechanism. Rendering of the virtual object corresponding to the real world object in the virtual world environment may be automatically discontinued in response to detection of the removal of the real world object from the detection area.

The method may detect a presence of a real world object within a detection area of a detection device by detecting a presence of a plurality of real world objects within the detection area and correlating identifiers associated with each of the real world objects with virtual object characteristic information for rendering the real world objects as virtual objects in the virtual world environment. At least one way in which at least two of the plurality of real world objects are utilized together may be determined based on the virtual object characteristic information. The virtual objects corresponding to the detected plurality of real world objects may be rendered within the virtual world environment based on the virtual object characteristic information and the determined at least one way in which at least two of the plurality of real world objects are utilized together such that at least two of the virtual objects are rendered as being utilized together.

The method may be implemented in a distributed data processing system. A first computing device may detect the presence of the real world object and may transmit information corresponding to the detection of the real world object to a second computing device in the data processing system. The second computing device may generate, in response to the detection of the presence of the real world object, the virtual object in the virtual world environment.

In a further illustrative embodiment, the method may further comprise activating one or more portions of the detection mechanism. Real world objects may only be detectable by the detection mechanism when the real world objects are placed within a detection area corresponding to the activated one or more portions of the detection mechanism. The one or more portions of the detection mechanism that are activated may be configured to represent a type of real world object that is to be placed within the detection area of the one or more portions of the detection mechanism.

The method may further comprise outputting, via the detection mechanism, an output to aid a user in placing real world objects within the detection areas of the activated one or more portions of the detection mechanism. The detection mechanism may be comprised of a grid of detectors and activating one or more portions of the detection mechanism may comprise activating one or more grid portions. Outputting an output to aid the user may comprise outputting a visual output that highlights the activated one or more grid portions.

In a further illustrative embodiment, a computer program product comprising a computer useable medium having a computer readable program is provided. The computer readable program, when executed on a computing device, causes the computing device to perform various ones, and combinations of, the operations previously described above with regard to the method illustrative embodiments.

In yet another illustrative embodiment, an apparatus for rendering virtual world objects based on a detected presence of a real world object is provided. The apparatus may comprise a computing device and a detection device coupled to the computing device. The detection device may detect a presence of a real world object within a detection area of the detection device. The computing device may comprise a processor and a memory, and the memory may comprise instructions. When the instructions are executed by the processor, the instructions may cause the processor to perform various ones, and combinations of, the operations previously described above with regard to the method illustrative embodiments.

In another illustrative embodiment, a system for rendering virtual world objects based on a detected presence of a real world object is provided. The system may comprise at least one network, a first computing device coupled to the at least one network, and a second computing device coupled to the at least one network. The first computing device may detect the presence of a real world object within a detection area of a detection device. The second computing device may generate, in response to detecting the presence of the real world object, a virtual object in a virtual world environment rendered. The virtual object may correspond to the real world object and may be rendered in the virtual world environment only while the presence of the real world object continues to be detected within the detection area of the detection device.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
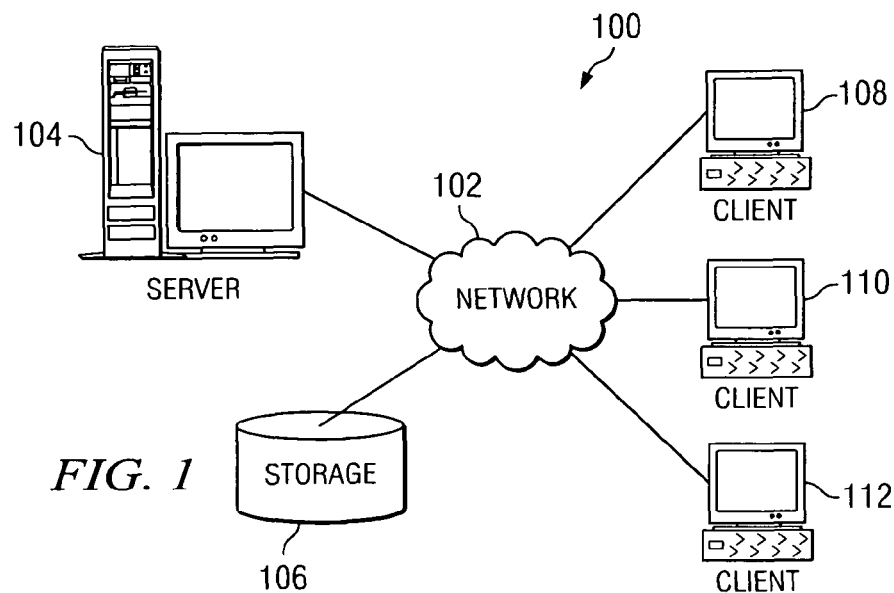
FIG. 1 is an exemplary block diagram of a distributed data processing environment in which aspects of the illustrative embodiments may be implemented.
Figure 2:
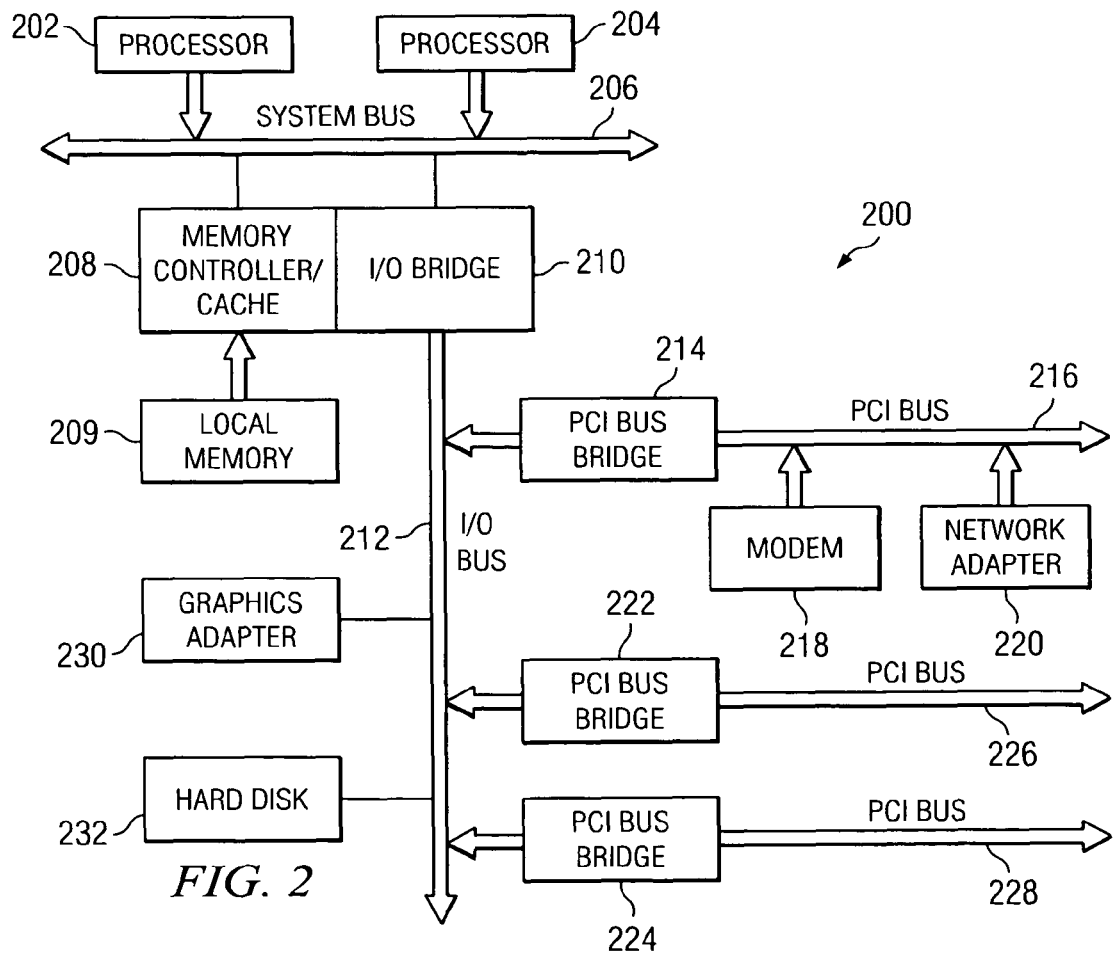
FIG. 2 is an exemplary block diagram of a server computing device in which aspects of the illustrative embodiments may be implemented.
Figure 3:
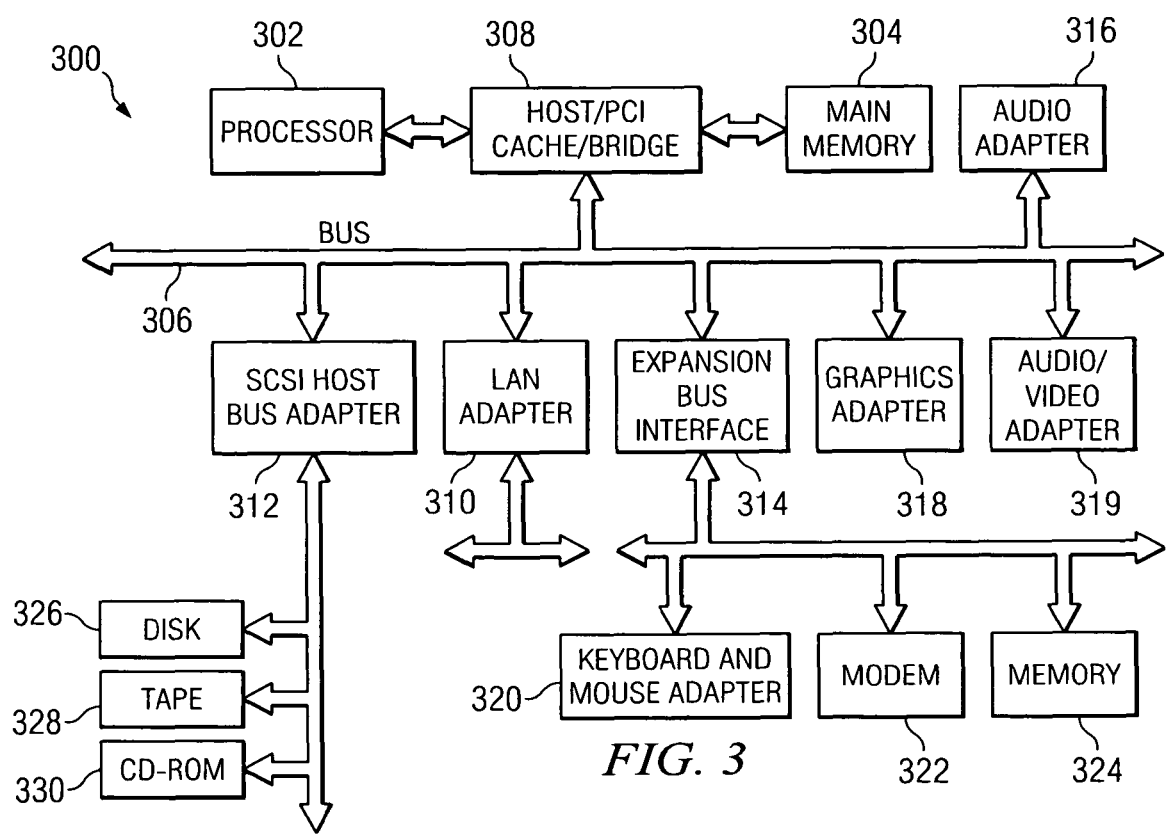
FIG. 3 is an exemplary block diagram of a client computing device in which aspects of the illustrative embodiments may be implemented.

The illustrative embodiments described hereafter provide a persistent authenticating system and method to map real world object presence into virtual world object awareness. As such, the illustrative embodiments may be implemented in a stand-alone computing device or in a distributed data processing environment in which multiple computing devices are utilized along with one or more data networks. Accordingly, FIGS. 1-3 hereafter are provided as examples of a distributed data processing environment and computing devices in which exemplary aspects of the illustrative embodiments may be implemented. FIGS. 1-3 are only exemplary and are not intended to state or imply any limitation with regard to the types and/or configurations of computing devices in which the illustrative embodiments may be implemented. Many modifications to the computing devices and environments depicted in FIGS. 1-3 may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a stand-alone or client computing device. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With regard to the illustrative embodiments of the present invention, the client/stand-alone computing device or server computing device executes software applications which provide a virtual world environment which is accessible by a user. For example, a user may interact with the virtual world via one or more input devices connected to the computing devices or connected to a client device that communicates with the computing device. One of these input devices, in accordance with the illustrative embodiments, is a detection mechanism for detecting the presence of real world objects. Such a detection mechanism may use any detection scheme suitable to the particular implementation including bar code scanners, radio frequency identifier (RFID) detection devices, dot code detection devices, and the like.

In a preferred embodiment, the detection mechanism is provided as a detection pad upon which real world objects may be placed and whose presence may be detected using a RFID detection device integrated into the detection pad. The detection pad has an associated detection area that comprises the pad itself and a limited range of space around the pad in which real world objects having associated RFID tags may be detected.

With regard to the illustrative embodiments herein, the detection mechanism, e.g., the detection pad, provides a mechanism by which the presence of a real world object is detected and, while the real world object's presence is continued to be detected, it is made available for use in a virtual world environment. Moreover, the detection of the presence of the real world object provides an identifier of the object which may be correlated with information regarding how to represent the real world object in the virtual world environment, how the object may be utilized in relation to other objects in the virtual world environment such that the real world object is modeled in the virtual world environment, characteristics of the virtual world object representation of the real world object with regard to the particular applications in which the virtual world object will be used in the virtual world environment, and the like. Furthermore, the detection of multiple real world objects may be performed and identification of each of the multiple real world objects may be used to determine how these real world objects may be utilized together in the virtual world environment.

One significant application of the illustrative embodiments described herein is to the field of computer gaming. Moreover, within the field of computer gaming, the illustrative embodiments are especially well suited for use with persistent virtual world type computer games. While the illustrative embodiments will be described in terms of computer games and persistent virtual world computer games, it should be appreciated that the illustrative embodiments are not limited to being applicable to only computer games. To the contrary, the illustrative embodiments may be used with any application in which real world objects may be rendered as virtual objects in a virtual environment.

In one illustrative embodiment, a computing device executes operations for monitoring a detection mechanism, which in the illustrative embodiments set forth herein is a detection pad, to detect when one or more real world objects are placed on the detection pad or within the detection area of the detection pad. The operations may continue to monitor the detection pad continuously or periodically to determine a current set of one or more real world objects that are within the detection area of the detection pad and compare the current set of real world objects to a previously detected set of real world objects to determine which objects have persistent presence and which objects are no longer within the detection area. Only real world objects that are present within the detection area of the detection pad may be modeled and represented in the virtual world environment. Thus, when a real world object is removed from the detection area of the detection pad, the object's representation in the virtual world environment is removed. In this way, the persistent presence of a real world object as detected by the detection pad is mapped into a virtual world object awareness.

In the illustrative embodiments, the detection pad is coupled to a stand-alone or client computing device. The virtual world environment is provided either directly by the stand-alone or client computing device, by one or more server computing devices with which the client computing device communicates, or by a combination of software applications running on the client computing device and one or more applications running on one or more server computing devices. Processing of information from the detection pad is first performed by the stand-alone or client computing device, using driver software and the like, for example, which converts inputs from the detection pad into data that is understandable by one or more software applications running on the client and/or server computing devices. In particular, the driver software receives inputs from the detection mechanisms of the detection pad, such as RFID detectors of the detection pad, and provides data to one or more software applications corresponding to the inputs received from the detection pad.

In the illustrative embodiments, the inputs received from the detection pad are representative of the detection of particular real world objects being within a detection area of the detection pad. For example, the RFID detectors of the detection pad may detect RFID tags associated with real world objects that are placed within the detection area of the detection pad and provide as inputs to the stand-alone or client computing device, the corresponding identifiers associated with the RFID tags detected. These identifiers may then be correlated with object information for associated real world objects, such as through a database lookup operation.

The real world objects preferably are objects that are to be represented by similar virtual objects that are modeled in a virtual world environment within the computing device. For example, the real world objects may be toys, e.g., action figures, toy vehicles, and the like, toy accessories, e.g., toy weapons, toy armor, and the like, models, etc. of objects that may be represented as virtual objects in the virtual world environment and used within the virtual world environment. When the real world object is present within the detection area of the detection pad, the real world object, e.g., the action figure, toy vehicle, toy weapon, etc., is represented in the virtual world in such a manner that is consistent with the usage of the object in the real world.

For example, if the real world object is a toy representation of a sword, the detection of the toy sword in the detection area of the detection pad causes a corresponding virtual sword to be represented in the virtual world environment. Moreover, the virtual sword is represented in the virtual environment in a manner consistent with the usage of a sword in the real world. Thus, if a user's virtual world avatar currently is involved in a combat situation, the virtual sword may be represented as being in a free hand of the avatar. If the user's virtual world avatar is currently not involved in combat, the virtual sword may be represented as being sheathed and hanging on the side of the user's avatar. The representation of the virtual sword in the virtual world environment may be maintained as long as the toy sword is detected as being present in the detection area of the detection pad. If the user were to remove the toy sword from the detection area of the detection pad, when the absence of the toy sword is detected by the detection pad, the virtual world representation of the toy sword is discontinued.

As mentioned above, the detection pad may detect multiple real world objects as being present within the detection area of the detection pad. The identification of the various real world objects in the detection area is used to retrieve information regarding the real world objects and how to represent the real world objects as virtual objects in a virtual world environment. As part of the determination as to how to represent the real world objects as virtual objects in the virtual world environment, the interaction between the identified real world objects may be determined using a rules database.

For example, assume that the real world objects on a detection pad comprise an action figure representing a knight and accessory objects that comprise a toy sword, a toy helmet, and a toy shield. Information corresponding to each of these detected items may be retrieved from a database associated with an application running in the computer system. This information may include an identification of how each item is utilized in the real world and how such usage is mapped to the virtual environment. Alternatively, a rules database may be provided that provides rules based on the detected real world object identifiers. For example, a rule may state that if a first real world object and a second real world object are detected on the detection pad, then the virtual object corresponding to the second real world object should be rendered as being in a particular association with the first real world object. Other such rules, which may be simpler or more complicated than the example rule given above, may be provided within a rules database that operate on the detected real world object identifiers and retrieved information corresponding to the real world object identifiers to determine how the virtual objects should be rendered in the virtual world environment.

For example, the toy sword (e.g., a second real world object) is used in the hand of an action figure as a weapon and has certain attack and defense characteristics. As a result, when representing the toy sword in conjunction with the action figure (e.g., a first real world object) as virtual objects in the virtual world environment, a virtual object corresponding to the toy sword may be represented in the hand or sheath of an avatar resembling the action figure that is present on the detection pad. Similarly, the toy shield, may be represented as a virtual shield object in a hand of the virtual action figure, i.e. the avatar, or on the back of the virtual action figure in the virtual world environment. The toy helmet is used on the head of the action figure and thus, is represented in the virtual world environment as a helmet object placed on the head of the virtual action figure. Thus, the proper interaction of the detected real world objects in the detection area of the detection pad is automatically determined and used to represent the real world objects as virtual objects in a manner consistent with the way in which these real world objects interact with each other in the real world.

Furthermore, the operations in the computing device may monitor a condition of the virtual world object representation of the real world object within the virtual world environment and, based on the condition of the virtual world object representation of the real world object, may disable the user's ability to use the real world object to generate a virtual world representation of the real world object. For example, if the real world object were a toy sword and the user, in a previous session in the virtual world environment, performed actions that resulted in his/her avatar's virtual sword, which corresponds to then real world toy sword, being damaged or broken, then the user's ability to place the toy sword on the detection pad and have a corresponding sword represented in the virtual world environment may be discontinued until the user performs appropriate actions in the virtual world environment, e.g., repairs the virtual representation of the sword in the virtual world environment.

Alternatively, a persistent state of the virtual representation of the real world object may be maintained in the virtual world environment such that each time a real world object is placed in the detection area of the detection pad, the persistent state of the virtual object corresponding to that real world object may be retrieved and used to render the virtual object in the virtual world environment. For example, using the damaged sword example discussed above, rather than discontinuing the ability of the user to generate a virtual object corresponding to the real world toy sword object on the detection pad, the previous state of the virtual sword may be retrieved and used to render the virtual sword representation of the real world toy sword. Thus, if a user, during a previous session in the virtual world environment, damages his virtual sword but fails to repair it, when the user next places the real world toy sword on the detection pad, the virtual sword object rendered in response to detecting the real world toy sword will be rendered as having the same damaged state as when the user last used that real world toy sword object with the virtual world environment.

Figure 4:
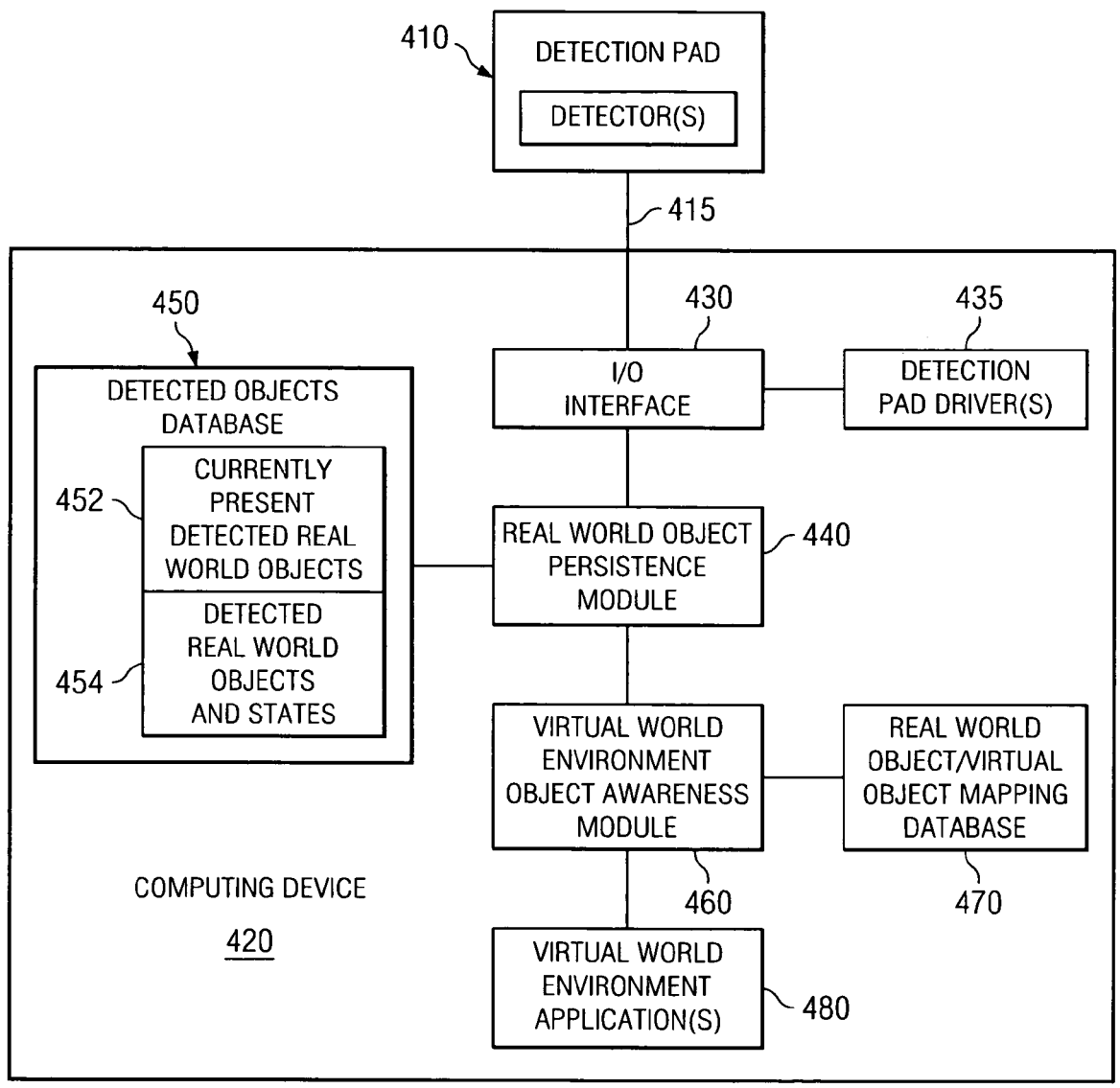
FIG. 4 is an exemplary block diagram illustrating a mechanism for detecting a persistent presence of real world objects such that the real world objects may be represented as virtual world objects in a virtual world environment in accordance with one illustrative embodiment.

FIG. 4 is an exemplary block diagram illustrating a mechanism for detecting a persistent presence of real world objects such that the real world objects may be represented as virtual world objects in a virtual world environment in accordance with one illustrative embodiment. The mechanism illustrative in FIG. 4 is an example of a stand-alone computing device. It should be appreciated that the stand-alone computing device in FIG. 4 is only exemplary of one illustrative embodiment and is not intended to state or imply any limitation with regard to the types of computing devices in which the present invention may be implemented. As mentioned previously above, the mechanisms of the illustrative embodiments may be distributed amongst a plurality of computing devices in a distributed data processing environment.

As shown in FIG. 4, the mechanism includes a detection pad 410 and a computing device 420. Elements 410 and 420 are preferably implemented as hardware units while the remaining elements shown in FIG. 4 may be implemented in hardware, software, or any combination of hardware and software without departing from the spirit and scope of the present invention.

The detection pad 410 includes one or more detectors, which may be integrated into the detection pad 410, for detecting the presence of real world objects within a detection area of the detection pad 410. The detection pad 410 transmits information to the computing device 420 either through a wired or wireless communication link 415. The information transmitted to the computing device corresponds to real world object identifiers, corresponding to identification devices that are affixed to or integrated with the real world objects, and which are detected by the detectors in the detection pad 410. This information may be detected by way of a barcodes provided on the real world objects, RFIDs, dot codes, or the like. In a preferred embodiment, the real world objects are provided with RFIDs and the detector in the detection pad 410 is configured to scan a detection area and detect the presence of RFIDs within the detection area. The use of RFIDs and RFID detectors is generally known in the art and thus, a detailed description is not provided herein.

The information transmitted to the computing device 420 from the detection pad 410 is input to the input/output interface 430. The input/output interface 430 preferably utilizes detection pad driver(s) 435 to interpret the inputs from the detection pad 410 and provide the corresponding data to the real world object persistence module 440.

The real world object persistence module 440 is responsible for determining what real world objects are currently present in the detection area of the detection pad 410 based on inputs from the detection pad 410, what real world objects have been removed from the detection area of the detection pad 410, as well as updating information in a detected objects database 450. The real world object persistence module 440 communicates information regarding the real world objects that are currently present within the detection area of the detection pad 410 with the virtual world environment object awareness module 460.

The virtual world environment object awareness module 460 is responsible for rendering virtual objects corresponding to the detected real world objects that are currently in the detection area of the detection pad 410 in the virtual world environment. The information communicated to the virtual world environment object awareness module 460 from the real world object persistence module 440 may be used to retrieve mapping information from the real world object/virtual object mapping database 470. The virtual world environment object awareness module 460 may utilize this mapping information to render virtual objects corresponding to the detected real world objects in the virtual world environment generated by the virtual world environment application(s) 480.

It should be noted that, because the depicted illustrative embodiment utilizes a stand-alone computing device 420, all of the elements 430-480 are shown as being part of the computing device 420. However, the present invention is not limited to such a configuration. Rather, many of the elements 430-480 may be provided in one or more other computing devices with which the computing device 420 may communicate via one or more networks. For example, elements 460-480 may be provided by a server computing device with which the computing device 420 is a client. In such an embodiment, the client computing device 420 is responsible for determining the real world aspects of the real world persistence to virtual world awareness mapping while the server computing device is responsible for the virtual world aspects of this mapping.

When a real world object having an associated identifier device associated with it, e.g., a barcode, dot code, RFID tag, or the like, is placed within the detection area of the detection pad 410, the presence of the real world object is detected by the detectors in the detection pad 410. In a preferred embodiment, the identifier device is permanently affixed to, or integrated with, the real world object, although this is not required for the functioning of the illustrative embodiments. Such permanent affixing or integration is intended to ensure that the real world object is within the detection area and not just the identifier device.

The detected identifier associated with the real world object is transmitted from the detection pad 410 to the computing device 420 via the communication link 415. The signals transmitted by the detection pad 410 are processed via the I/O interface 430 using the detection pad driver(s) 435.

The resulting identifier information is provided to real world object persistence module 440.

The real world object persistence module 440 receives the identifier information and performs a lookup of the identifier information in the detected objects database 450. The detected objects database 450 preferably has two primary portions. In a first portion 452, the detected objects database 450 maintains a current real world objects data structure that has entries for each real world object that is detected as being currently present within the detection area of the detection pad 410. In a second portion 454, the detected objects database 450 maintains a current status of all real world objects that have been detected using the detection pad 410. The second portion 454 maintains information regarding real world objects that are currently present within the detection area of the detection pad 410 as well as real world objects that are not currently detected as being within the detection area but have been detected by the detection pad 410 previously.

In response to receiving the real world object identification information, a determination is made as to whether an entry for that particular real world object is currently present in the first portion 452 of the detected objects database 450. If not, a new entry in the first portion 452 is generated. The entry may be indexed by the identifier associated with the real world object and may contain, for example, information identifying a current state of the virtual world object that corresponds to the real world object, which may be determined based upon previous state information retrieved from the second portion 454. This state information may be updated periodically, or when a change in state of the virtual world object that corresponds to the real world object occurs in the virtual world environment provided by application(s) 480.

If an entry does not already exist in the first portion 452 of the detected objects database 450, then the real world object persistence module 440 sends a message to the virtual world environment object awareness module 460 indicating that a new real world object has been detected and provides the identification information for the new real world object. In response, the virtual world environment object awareness module 460 maps the real world object identifier to a virtual object that is to be represented in the virtual world environment. This mapping is performed using mapping information retrieved from the real world object/virtual object mapping database 470. The information maintained in the real world object/virtual object mapping database 470 includes pointer information identifying the data, files, etc. corresponding to a virtual world representation of the real world object, i.e. the virtual object, and pointer information for data, files, etc. that identify the manner by which the virtual object is utilized within the virtual world environment. These data, files, etc. preferably model the real world object as a virtual object in such a manner that the virtual world object emulates the real world object not only in appearance but in the manner by which the real world object is utilized with other objects in the real world.

The virtual world environment object awareness module 460 interfaces with the virtual world environment provided by the virtual world environment application(s) 480 running on the computing device 420. The virtual world environment object awareness module 460 informs the virtual world environment application(s) of the virtual objects that correspond to real world objects whose presence is currently detected by the detection pad 410 as well as the necessary information for rendering the virtual objects and modeling the virtual objects with regard to the virtual objects' interaction with the virtual world. In this way, a virtual object corresponding to a detected real world object may be generated and utilized in a virtual world environment.

In addition to registering real world objects that are detected using the detection pad 410, the real world object persistence module 440 also checks the first portion 452 of the detected objects database 450 to determine if there are any entries for real world objects that are no longer detected as being within the detection area of the detection pad 410. That is, the identifier information obtained based on the inputs from the detection pad 410 are compared to the entries in the first portion 452 of the detected objects database 450 as previously described above.

Entries that are created or already existing in the first portion 452 that match the identifiers of the real world objects detected using the detection pad 410 are temporarily marked, e.g., a bit flag is set, to thereby identify the entry as being associated with a real world object that is currently present in the detection area of the detection pad 410. The real world object persistence module 440 may then check the entries in the first portion 452 of the detected objects database 450 and thereby identify which entries are not marked as being associated with real world objects that are currently detected in the detection area of the detection pad 410. The real world objects associated with these entries are real world objects that have been removed from the detection area of the detection pad 410.

The real world object persistence module 440 may communicate with the virtual world environment object awareness module 460 to inform the virtual world environment object awareness module 460 that the virtual objects corresponding to the real world objects that were removed from the detection area should be removed from the virtual world environment. In response to such a communication, the virtual world environment object awareness module 460 sends a message to the virtual world environment application(s) 480 to discontinue the rendering of the virtual objects corresponding to the removed read world objects.

The above described operation for detecting real world objects and identifying which real world objects have been removed from a detection area may be performed continuously or periodically. In this way, only those real world objects whose presence is persistent as detected by the detection pad may have their corresponding virtual objects continue to be rendered and utilized in the virtual world environment. Thus, a real world object persistence is mapped to a virtual world object awareness.

In a further illustrative embodiment, the virtual world environment object awareness module 460 determines the manner by which a plurality of real world objects detected within the detection area of the detection pad 410 interact with one another or are utilized with each other, if at all, so that they may be accurately represented as a combination of virtual objects in the virtual world environment. For example, if the real world object persistence module 440 receives identifier information for an action figure, a helmet for the action figure, a sword for the action figure, and a shield for the action figure, the virtual world environment object awareness module 460 determines how these objects may be utilized together based on information maintained within the real world object/virtual object mapping database 470. For example, the virtual world environment object awareness module 460 may determine through a lookup of the real world object identifiers in the real world object/virtual object mapping database 470 that the sword should be placed in a right hand of the action figure, the helmet should be placed on a head of the action figure, and the shield should be placed in the left hand of the action figure.

Based on this determination, the virtual world environment object awareness module 460 may generate a virtual avatar in the virtual world environment, based on the information retrieved from the real world object/virtual object mapping database 470, and may place a sword virtual object corresponding to the real world sword object in the right hand of the virtual avatar, a shield virtual object corresponding to the real world shield object in the left hand of the virtual avatar, and a helmet virtual object corresponding to the helmet real world object on the head of the virtual avatar. The user may then utilize these objects within the virtual world environment in a manner corresponding to the models of these objects within the virtual world. The modeling of virtual objects in a virtual world environment is generally known in the art and thus, a detailed description is not provided herein.

Thus, the virtual world environment object awareness module 460 is able to determine the manner by which each of the accessory real world objects, i.e. the sword, shield and helmet, are utilized with or interact with the action figure real world object. This interaction is then modeled in the virtual world environment by providing a combination of virtual objects that are modeled after the manner by which the detected real world objects are utilized in the real world. Of course for objects that do not actually operate in the real world, e.g., toys that represent fantasy type items, such as wands, magical creatures, and the like, the utilization of the objects in the virtual world may be completely based upon the modeling specified by the programmer which may or may not have any relation to the real world.

In yet a further illustrative embodiment, the current status of a virtual object in the virtual world environment that corresponds to a real world object detected using the detection pad 410 may be persisted and associated with the real world object such that when the real world object is detected again by the detection pad 410, the last state of the virtual object corresponding to the real world object may be retrieved. As an example, assume that a real world object that is detected by the detection pad 410 corresponds to a toy sword for an action figure. The toy sword is rendered in the virtual world environment as a virtual sword object that may be utilized by a virtual avatar to battle enemies in the virtual world environment. During the process, the virtual sword object may sustain damage that causes the virtual sword object to be less effective or need repair. Such a status may be determined and maintained in the virtual world environment.

In response to a determination that the real world toy sword object is removed from the detection area of the detection pad 410, or the user discontinuing a session within the virtual world environment, the current status of the virtual sword object may be reported back to the real world object persistence module 440. The real world object persistence module 440 may then store this current status in the second portion 454 of the detected objects database 450 in associated with the identifier of the real world toy sword object. In this way, when the real world toy sword object is again placed within the detection area of the detection pad 410, the real world object persistence module 440 may retrieve the current status information from the second portion 454 of the detected objects database 450 and provide the current status information to the virtual world environment object awareness module 460. The virtual world environment object awareness module 460 may then use this current status information when rendering and modeling the virtual sword object in the virtual world environment.

In one illustrative embodiment, the current status information may identify any status that may be modeled within the virtual world environment, e.g., damaged, needing repair, ineffective, destroyed, etc. In another illustrative embodiment, the current status information may simply identify real world objects that may be rendered as virtual objects within the virtual world environment and real world objects that cannot until some action in the virtual world environment is taken. For example, if virtual sword object in the virtual world environment is broken within the virtual world environment, this status may be stored in association with the real world toy sword object and thus, when the real world toy sword object is placed within the detection area of the detection pad, the virtual sword object is not rendered until the user visits a blacksmith in the virtual world environment and has the virtual sword object repaired. Thus, not only is the presence of the real world objects within the detection area of the detection pad made persistent, but the virtual status of the virtual objects corresponding to the real world objects is persisted in association with the real world objects.

Figure 5A:
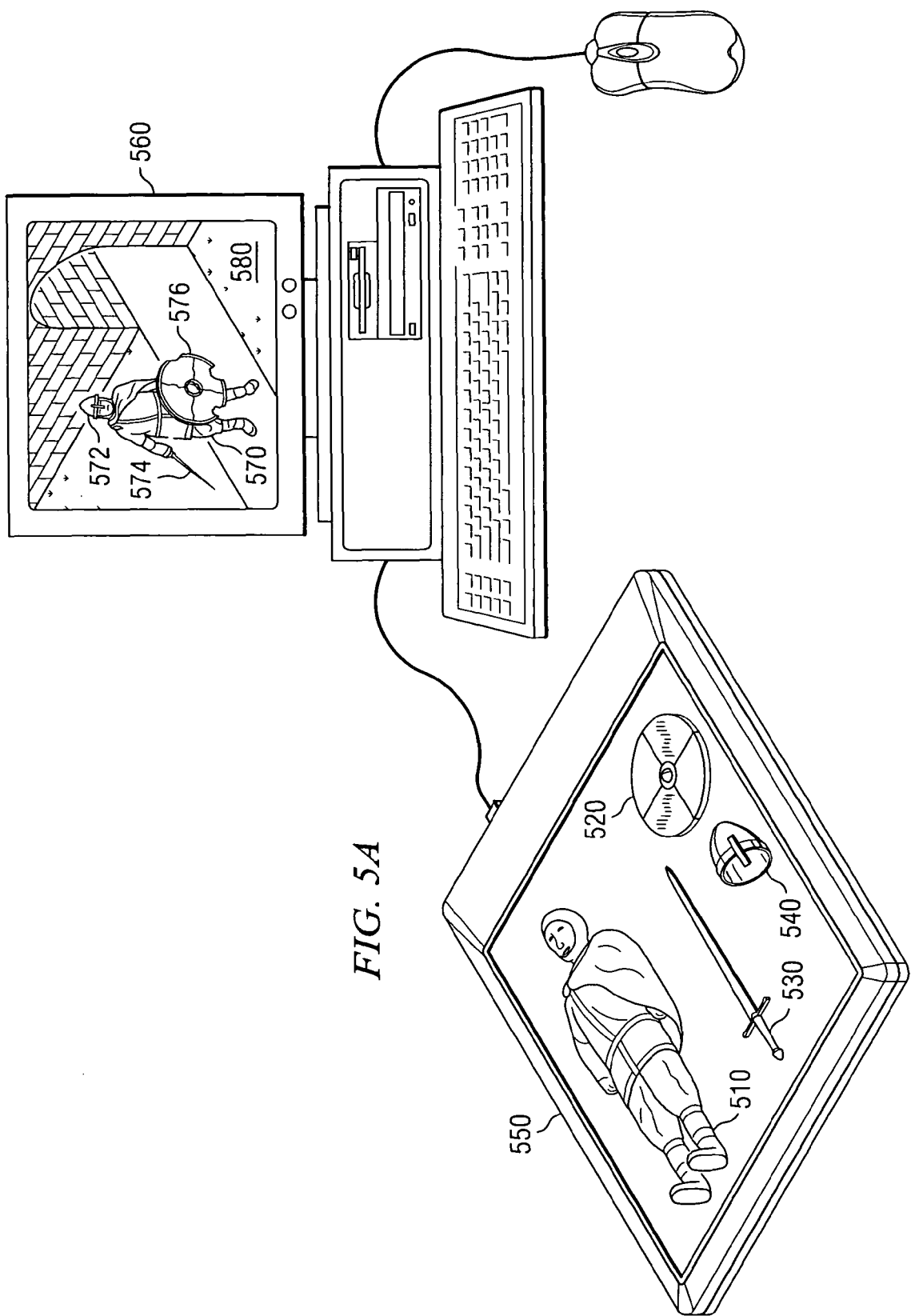
FIG. 5A is pictorial diagram illustrating the rendering of virtual objects in a virtual world environment that correspond to real world objects that are detected as being present in a detection area of a detection pad in accordance with an illustrative embodiment.

FIG. 5A is pictorial diagram illustrating the rendering of virtual objects in a virtual world environment that correspond to real world objects that are detected as being present in a detection area of a detection pad in accordance with an illustrative embodiment. As shown in FIG. 5A, an action figure 510 representing a knight is placed on a detection pad 550 along with accessories for the action figure that include a toy shield 520, a toy sword 530, and a toy helmet 540. Each of these real world objects has an associated RFID tag attached or integrated into them that identifies the real world objects. The detection pad 550 detects the presence of these real world objects and transmits the identification information to the computing device 560.

In an illustrative embodiment, the computing device 560 runs software modules corresponding to elements 430-480 of FIG. 4. Thus, the computing device 560, using the various operations described above with regard to FIG. 4, determines how to render the virtual avatar 570 in the virtual world environment 580 output using the display of the computing device 560. As shown, the virtual avatar 570 includes a helmet virtual object 572 placed on a head location of the virtual avatar 570, a sword virtual object 574 in a right hand of the virtual avatar 570, and a shield virtual object 576 in a left hand of the virtual avatar 570. Because the shield virtual object 576 had been used in a previous session and was damaged, the rendering of the shield object 576 shows the shield virtual object 576 as being damaged.

Figure 5B:
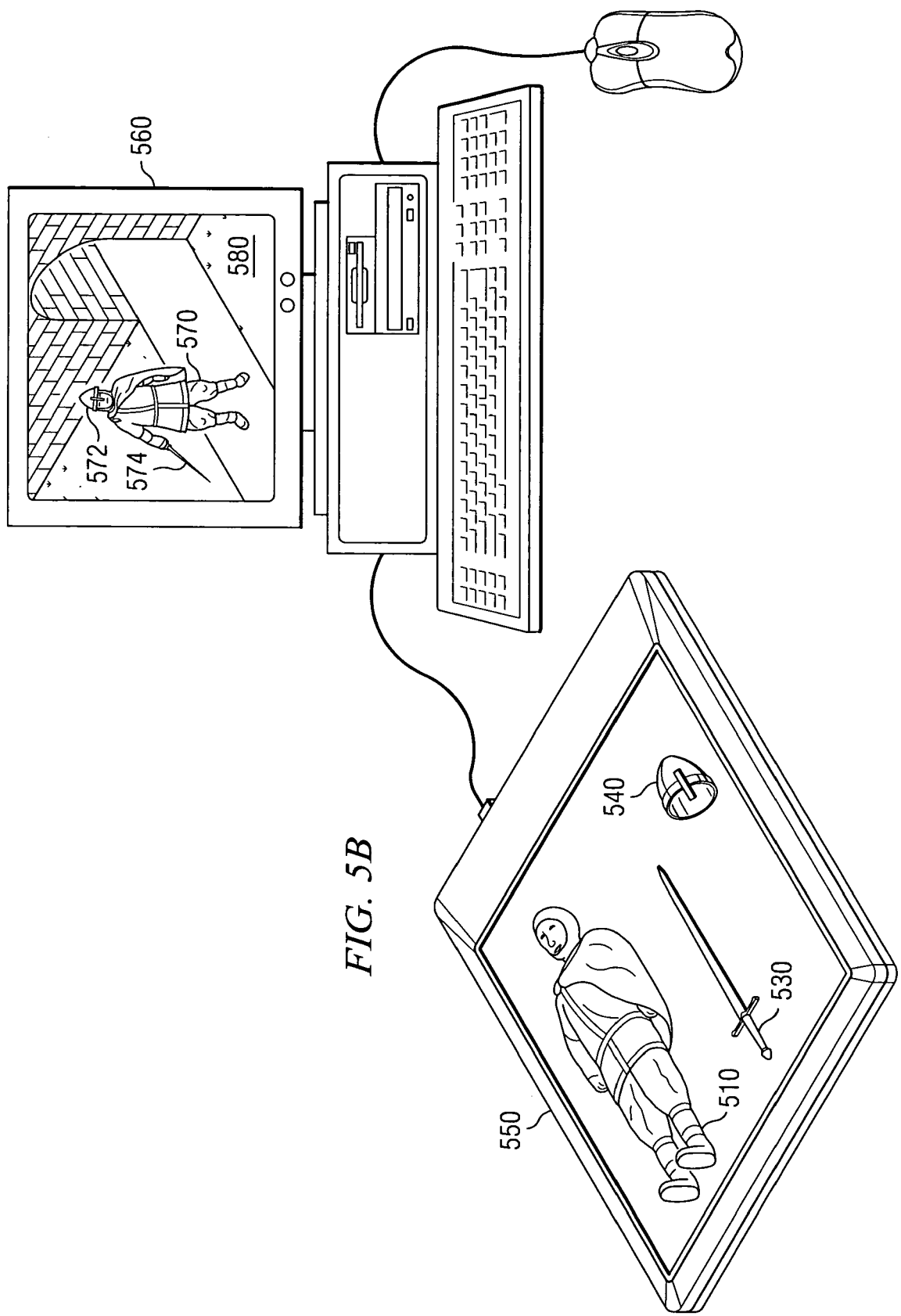
FIG. 5B is pictorial diagram illustrating the discontinuing of the rendering of a virtual object in a virtual world environment when its corresponding real world object is no longer detected as being present in a detection area of a detection pad in accordance with an illustrative embodiment.

FIG. 5B is pictorial diagram illustrating the discontinuing of the rendering of a virtual object in a virtual world environment when its corresponding real world object is no longer detected as being present in a detection area of a detection pad in accordance with an illustrative embodiment. As shown in FIG. 5B, the toy shield real world object 520 has been removed from the detection area of the detection pad 550. In response, the computing device 560 detects the removal of the toy shield real world object 520 and discontinues rendering of the shield virtual object 576 in the virtual world environment 580. Thus, the virtual avatar 570 is shown in the virtual world environment 580 as having only the helmet virtual object 572 and the sword virtual object 574.

Figure 6:
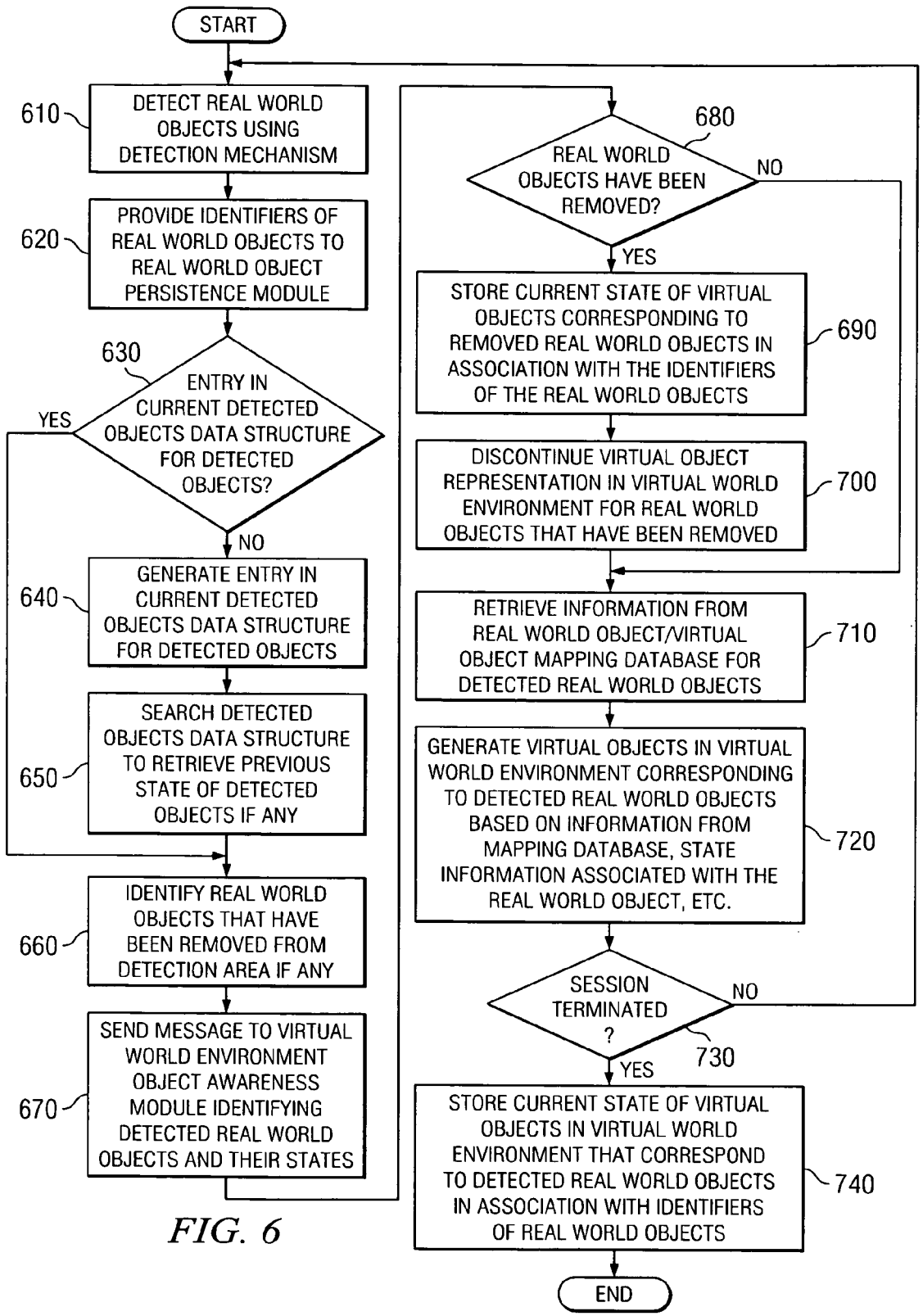
FIG. 6 is a flowchart outlining an exemplary operation of a real world object persistence to virtual object awareness mapping mechanism in accordance with an illustrative embodiment.

FIG. 6 is a flowchart outlining an exemplary operation of a real world object persistence to virtual object awareness mapping mechanism in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts with the detection of real world objects using the detection mechanism, e.g., the detection pad (step 610). The identifiers of the real world objects that are detected are provided to the real world object persistence module (step 620). A determination is made as to whether an entries are already existing in the current detected objects data structure for the detected real world objects (step 630). If not, an entry for each detected real world object that does not already have an entry in the current detected objects data structure is generated (step 640). A previous state associated with the detected real world objects that did not have an entry is retrieved from the detected objects data structure if such a previous state exists (step 650).

Thereafter, or if all of the detected real world objects have associated entries in the current detected objects data structure, the real world objects that have been removed from the detection area of the detection mechanism are identified (step 660). One or more messages are sent to the virtual world environment object awareness module identifying detected real world objects and their associated states, if any (step 670). A determination is made as to whether any real world objects were removed from the detection area of the detection mechanism (step 680). If so, then the current state of the virtual objects corresponding to the removed real world objects is stored in association with the identifiers of the real world objects that were removed (step 690). The representation of the virtual objects corresponding to the removed real world objects is then discontinued in the virtual world environment (step 700).

Thereafter, or if no real world objects were removed from the detection area of the detection mechanism, information is retrieved from the real world object/virtual object mapping database for the currently detected real world objects (step 710). Virtual objects corresponding to the currently detected real world objects are generated in the virtual world environment based on information from the mapping database, state information associated with the real world objects, and the like (step 720). As previously noted above, the generation of such virtual objects may further involve determining the manner by which the real world objects interact with each other or otherwise are related to each other and then depicting the virtual objects in a manner consistent with such interaction or relation.

A determination is made as to whether the session with the virtual world environment has been terminated (step 730). If not, the operation returns to step 610 and is repeated. If the session has been terminated, the current state of the virtual objects corresponding to the currently detected real world objects is stored in association with the identifiers of the real world objects (step 740). The operation then terminates.

The above illustrative embodiments describe the detection mechanism as primarily being an input device to a computing system. It should be noted that the detection mechanism may further be used as an output device as well and may be configured to include output mechanisms for outputting information to a user in a visual, auditory, and/or tactile manner. In particular, as an output device, the detection mechanism may be configured to provide output to the user so as to guide the user in the use of the detection mechanism with the real world objects that are placed within the detection area of the detection mechanism.

Figure 7:
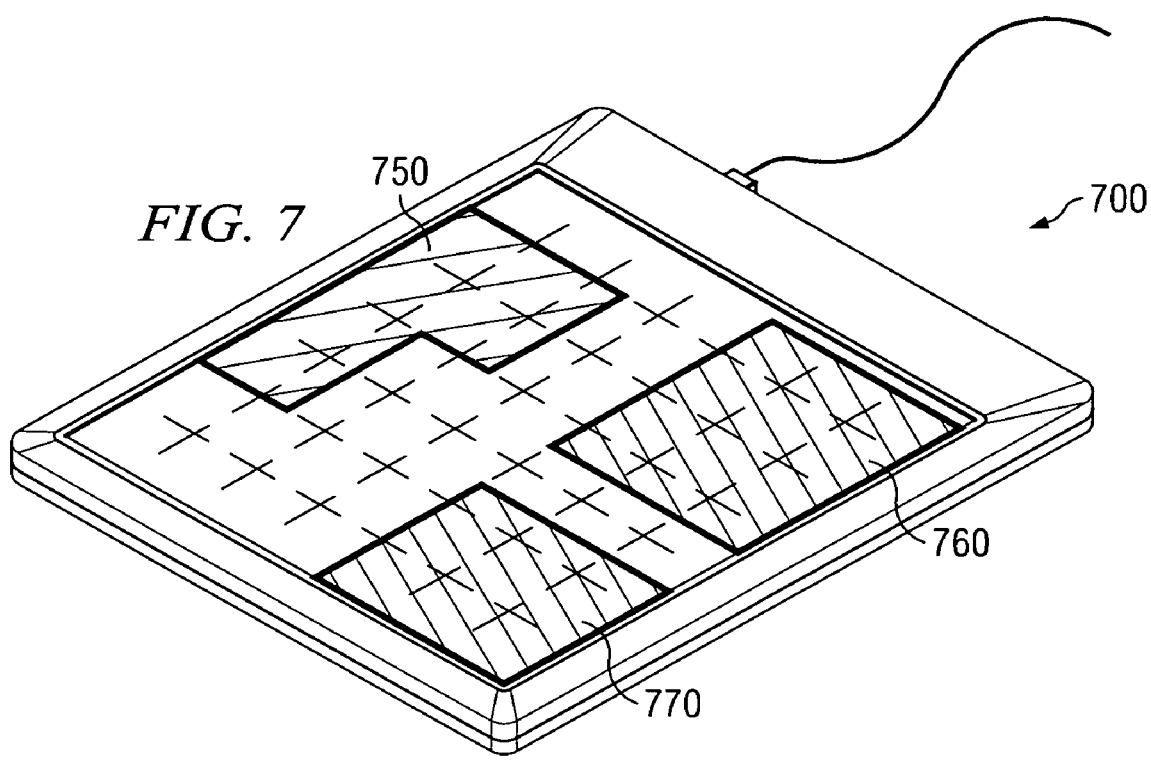
FIG. 7 is a diagram illustrating an exemplary implementation of the illustrative embodiments in which the detection mechanism has a grid array that may be activated in a customized manner depending upon the virtual world environment with which the detection mechanism operates.

For example, as mentioned above, the detection mechanism of the illustrative embodiments, e.g., the detection pad, may have a plurality of detectors or sensors that are used to detect or sense the presence of a real world object within a detection area of the detection mechanism. These detectors or sensors may be configured in any manner suitable to the particular implementation of the illustrative embodiments selected. In one illustrative embodiment, these detectors/sensors may be configured in a grid-like manner within the detection mechanism. Moreover, as shown in FIG. 7, the detection mechanism may have visual output elements that are arranged in a similar grid-like manner that may be selectively activated so as to inform a user of areas of the detection mechanism where certain real world objects may be placed.

For example, based on inputs to the detection pad generated by a virtual world environment software program, various ones of the visual output elements may be energized or otherwise made more noticeable (hereafter referred to as being "highlighted") in accordance with a desired output pattern 750 on the detection pad. This output pattern may be representative, for example, of the types of real world objects that may be placed on the detection pad and used with the virtual world environment. In one illustrative embodiment, the visual output elements may be light emitting diodes (LEDs) or other types of light generating devices that may be selectively activated so as to display a pattern on the detection pad. The particular shapes that may be generated using such visual output elements are not limited by the illustrative embodiments herein and may encompass any shape that may be represented using a grid of visual output elements.

For example, a human pattern may be highlighted or outlined for an adventure or role playing game virtual world environment. For a trading card based game, card placement blocks may be highlighted signifying different play areas in which real world objects may be placed. Moreover, the particular areas of the detection pad that are highlighted may be associated with activated detectors or sensors such that portions of the detection pad that are not highlighted are not active. In this way, selected portions of the detection pad may be activated, depending upon the particular virtual world environment with which the detection pad is being utilized, and may be used to detect the presence of real world objects while other areas are de-activated and will not detect the presence of real world objects even if the real world objects are present in these areas.

The use of a grid-like array of detectors/sensors allows the possibility to associate coordinates with real world objects placed within the detection field. That is, a coordinate system may be established with the detectors/sensors of the detection pad, such as a lower left corner of the detection pad being at coordinates (0,0), and this coordinate system may be used to determine the relative placement of real world objects on the detection pad. The ability to associated coordinates with real world objects aids in the relative rendering of virtual objects in the virtual world environment that correspond to real world objects placed on the detection pad. For example, if the virtual world environment represents a strategy board game, the relative placement of real world pieces may be determined using the coordinate system of the detection pad and used to render virtual objects corresponding to those pieces with the same relative placement in the virtual world environment.

Figure 8A:
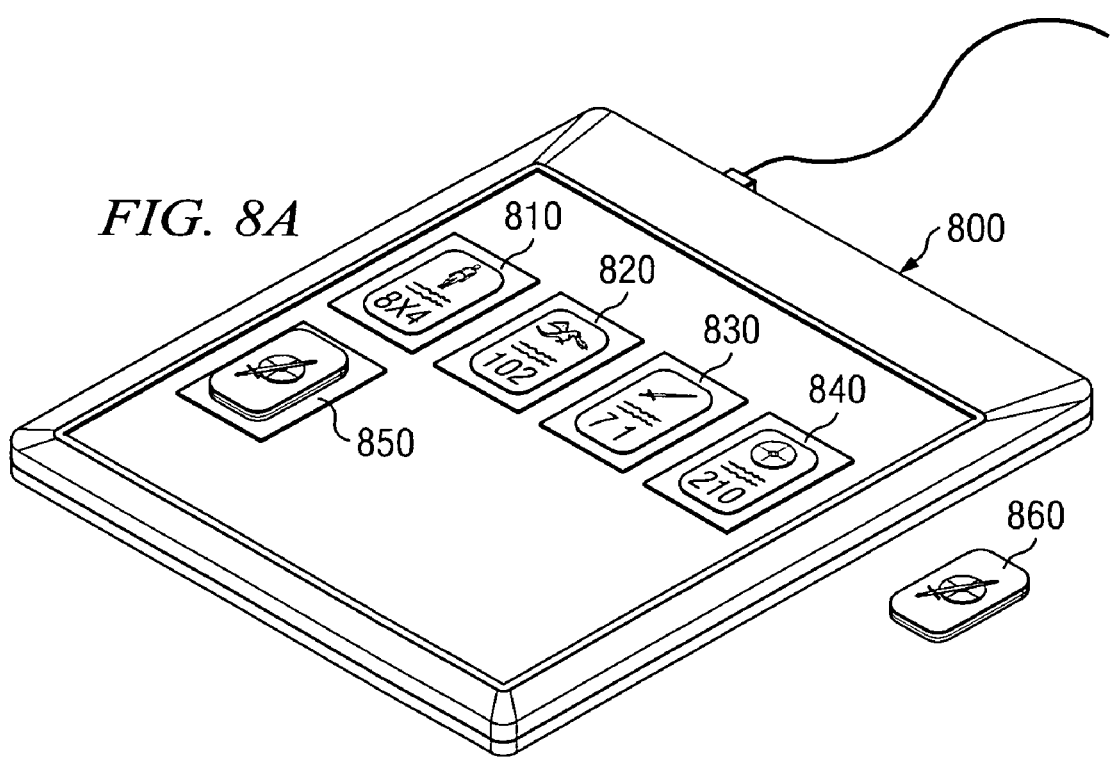
FIG. 8A-8C are diagrams illustrating various implementations of the illustrative embodiments for different types of applications.
Figure 8B:
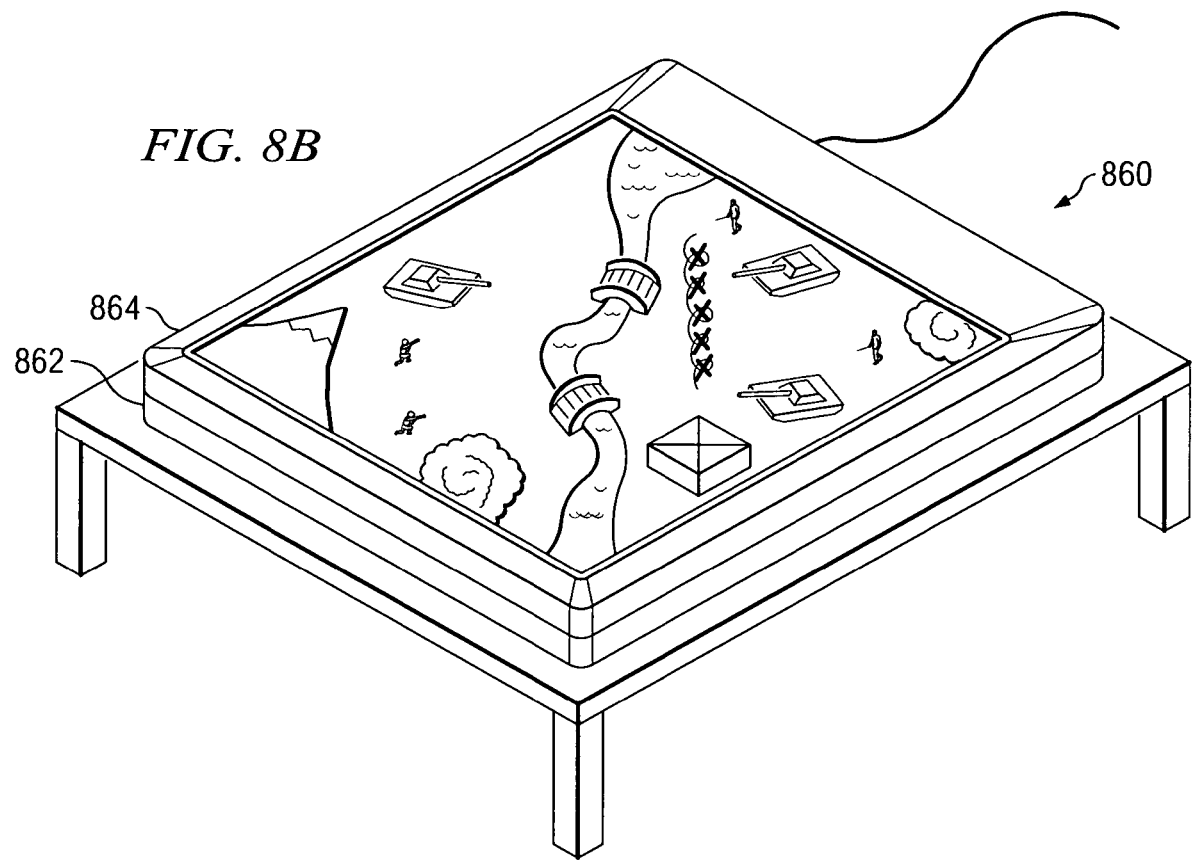
Figure 8C:
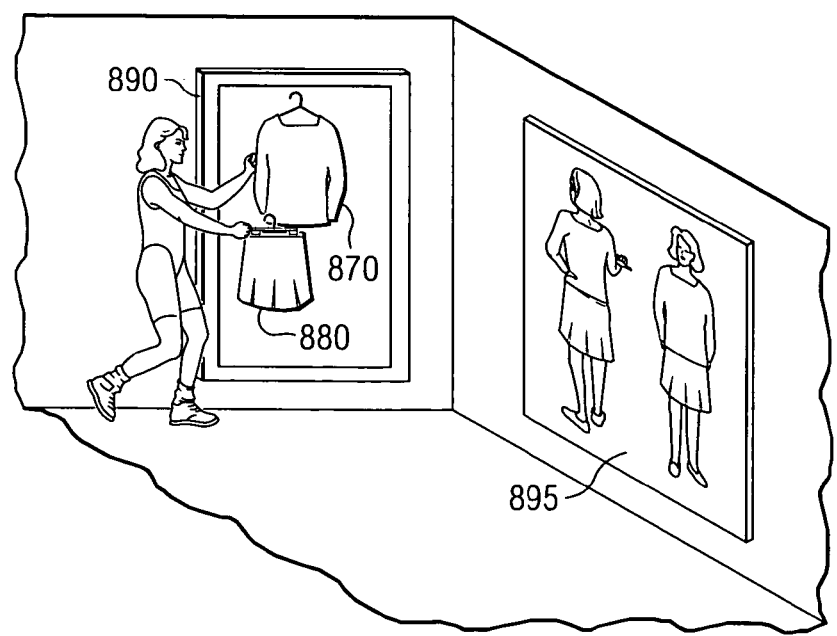

FIGS. 8A-8C illustrate some exemplary applications of the detection mechanism of the illustrative embodiments. As shown in FIG. 8A, the detection mechanism 800 of the illustrative embodiments may be used to highlight active areas 810-850 of the detection mechanism 800 in which playing cards for a collectable card game may be placed. For example, active areas 810-840 represent cards that are in play while active area 850 represent the active deck for the card game. Cards that have been played and that are no longer in play may be removed from the detection pad 800, as shown by played deck 860. The cards that are in play in active areas 810-850 are detected by the detectors associated with these active areas and corresponding virtual objects may be generated in a virtual world environment represented in a computing device. These virtual objects may be virtual cards or may be virtual objects corresponding to items, people, creatures, or the like, that are represented by the real world cards.

FIG. 8B illustrates another detection mechanism 860 that is configured for use with large board games such as strategy games or the like. As shown, the detection mechanism 860 has a first portion 862 that comprises the detection array, i.e. the array or detectors/sensors for detecting the presence of real world objects. The first portion 862 may further comprise the visual output elements described previously above. A second portion 864 may comprise a display device that is capable of generating graphical displays, e.g., a liquid crystal display, plasma display, or the like. The second portion 864 may be used to output a representation of a playing field upon which real world objects may be placed while the first portion 862 detects the presence of these real world objects on the detection mechanism. The playing field may be represented as graphical images, such as of rivers, mountains, and other terrain, and may be generated based on outputs from the virtual world environment software running on the computing device to which the detection mechanism 860 is connected, or the like. The presence of the real world objects on the detection mechanism 860 may be translated into a virtual object awareness in the virtual world environment generated by such software. For example, while the detection mechanism 860 may represent a two-dimensional playing field, the computing device in which the virtual world environment is rendered may represent the two-dimensional playing field in three dimensions.

Thus, the second portion 864 provides a mechanism by which images and/or topological information may be overlaid on the detection mechanism's surface to convey detail that enhances the software program with which the detection mechanism is being used. In a further example, in addition to highlighting/activating portions of the detection mechanism based on the particular programs with which the detection mechanism interfaces as described above, images may be displayed within these highlighted/activated areas that depict the types of real world objects that should be placed in these highlighted/activated areas. For example, an image of a playing card may be displayed within the highlighted areas 810-840 of FIG. 8A.

The various illustrative embodiments described above are primarily directed to computer game virtual world applications, however the illustrative embodiments are not limited to computer gaming. To the contrary, there are numerous non-gaming applications with which the illustrative embodiments may be utilized. For example, As a non-gaming related example, using the highlighting/activation of grid patterns or locations on the detection mechanism, as described above, a parts list for products requiring assembly may be displayed and the presence of these parts may be detected. For example a product may be purchased that requires assembly. The pieces of the product may have identifier tags embedded or otherwise attached to them and may be deposited on the presence detection mechanism. An assembly program with which the detection mechanism interfaces may be run on an associated computing device and, for each step of the assembly instructions, the grid location corresponding to the component to be assembled/used next in the series of assembly steps may be highlighted. The assembly program may detect the presence of the pieces via the detection mechanism and represent the pieces in a virtual world environment in which the various steps for assembly of the product are virtually represented. Moreover, the assembly program may perform a check of the complete inventory of items against the assembly program before assembly begins to ensure that all the necessary pieces are present.

As a further non-gaming related example implementation of the illustrative embodiments, the detection mechanism may be used to represent clothing in a virtual world environment, such as on a virtual mannequin, as illustrated in FIG. 8C. For example, a user may register with a computing system and provide general dimensions for the user. The user may register with the computing system either directly in the clothing store where the real world clothing objects are present or may register on-line from another location, for example.

Having registered with the computing system, the user may select various pieces of clothing 870-880 and place them on the detection mechanism 890, which may be oriented horizontally, vertically, or the like. The detection mechanism 890 may detect the presence of these clothing items 870-880 and, through the mechanisms previously described above, determine how to represent these real world objects as virtual objects in the virtual world environment in which the virtual mannequin is present. In essence, the detected pieces of clothing may be mapped as virtual clothing onto the virtual mannequin that has the dimensions of the user. The virtual mannequin with the virtual clothing mapped thereon may be displayed to the user via a display device 895 so that the user may view the results of the mapping. In this way, the user may be able to visualize the way in which the clothing may look on their frame without having to actually try on the clothing. Thus, with this implementation, the illustrative embodiments help to alleviate the cumbersome nature of tying on clothes and reduce the work to merely matching clothing items and selecting appropriate sizes.

As can be seen from the various implementations of the illustrative embodiments described above, the size of the detection mechanism, e.g., the detection pad, is not limited by the illustrative embodiments described herein. To the contrary, the size of the detection pad may be determined based on the particular implementation and intended use of the detection pad. For example, if the detection pad will be used primarily with a strategy game virtual world environment, in which a large number of pieces may be placed on a large game board, the game pad may be large enough to cover a typical dining room table or coffee table. On the other hand, if the detection pad is to be used with a card game virtual environment, then the detection pad may be quite small in size relative to a dining room table or coffee table.

Thus, the illustrative embodiments provide a mechanism for detecting the persistent presence of real world objects and translating this persistent presence into a virtual object awareness in a virtual world environment. With the mechanisms of the illustrative embodiments virtual objects corresponding to currently detected real world objects may be generated based on detected identifiers of the real world objects. These virtual objects may be generated in such a manner as to be consistent with the intended interaction or relationships of the real world objects. When a real world object is detected as having been removed from the detection area of the detection mechanism, the virtual object corresponding to that real world object is removed from the virtual world environment. Thus, virtual objects corresponding to real world objects are only able to be utilized in the virtual world environment while their corresponding real world objects are detected within a detection area of a detection mechanism.

The illustrative embodiments described above may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

As previously described above with regard to FIGS. 1-3, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for rendering virtual world objects based on a detected presence of a real world object, comprising:

detecting a presence of a real world object within a detection area of a detection device;

retrieving, from a storage device associated with the data processing system, virtual object characteristic information corresponding to the real world object in response to detecting the presence of the real world object; and generating a virtual object in a virtual world environment rendered in the data processing system based on the virtual object characteristic information;

wherein retrieving the virtual object characteristic information corresponding to the real world object further comprises:

retrieving virtual object condition information corresponding to the real world object from a storage device associated with the data processing system, wherein the virtual object condition information is stored in association with an identifier of the real world object; and rendering the virtual object such that the virtual object has a condition corresponding to the virtual object condition information, wherein:

the virtual object condition information is virtual object condition information stored in the storage device during a previous user session with the data processing system and corresponds to a last condition of the virtual object in the virtual world during the previous user session, and updated virtual object condition information corresponding to a last condition of the virtual object at the end of a current user session is maintained in the storage device between user sessions with the data processing system such that when the real world object is again placed in the detection area of the detection device during a subsequent session with the data processing system, the stored updated virtual object condition information, corresponding to the last condition of the virtual object in the virtual world during the current user session, is retrieved and used to render the virtual object as having a condition corresponding to the stored updated virtual object condition information, in the subsequent user session.

2. The method of claim 1, wherein the detection device is a detection pad having one or more detectors integrated therein and upon which real world objects may be placed.

3. The method of claim 1, wherein the virtual object characteristic information comprises at least one of information identifying how the virtual object may be utilized in relation to other virtual objects in the virtual world environment such that the real world object is modeled in the virtual world environment, or characteristics of the virtual object with regard to particular applications in which the virtual object will be used in the virtual world environment.

4. The method of claim 1, wherein detecting a presence of a real world object within a detection area of a detection device comprises:

detecting a presence of a plurality of real world objects within the detection area;

correlating identifiers associated with each of the real world objects with virtual object characteristic information for rendering the real world objects as virtual objects in the virtual world environment;

determining at least one way in which at least two of the plurality of real world objects are utilized together based on the virtual object characteristic information; and rendering virtual objects corresponding to the detected plurality of real world objects within the virtual world environment based on the virtual object characteristic information and the determined at least one way in which at least two of the plurality of real world objects are utilized together such that at least two of the virtual objects are rendered as being utilized together.

5. The method of claim 1, wherein the real world object is a toy and wherein the virtual world environment is a virtual computer gaming environment.

6. The method of claim 1, further comprising:
activating one or more detection portions of the detection device, the one or more detection portions being less than a total number of detection portions available on the detection device, wherein real world objects are only detectable by the detection device when the real world objects are placed within a detection area corresponding to the activated one or more detection portions of the detection device.

7. The method of claim 6, wherein the one or more detection portions of the detection device that are activated are configured to represent a type of real world object that is to be placed within the detection area of the one or more detection portions of the detection device.

8. The method of claim 6, further comprising:
outputting, via the detection device, an output to aid a user in placing real world objects within the detection areas of the activated one or more detection portions of the detection device.

9. The method of claim 8, wherein:
the detection device is comprised of a grid of detectors,
activating one or more detection portions of the detection device comprises activating one or more grid portions, and
outputting an output to aid the user comprises outputting a visual output that highlights the activated one or more grid portions.

10. The method of claim 1, wherein the condition of the virtual object represents a difference amount in at least one characteristic of the virtual object from an original amount for the at least one characteristic.

11. The method of claim 1, wherein the condition of the virtual object is representative of a virtual damage level of the virtual object.

12. The method of claim 1, wherein:
the condition information of the virtual object identifies an amount of virtual damage sustained by the virtual object within the virtual work environment such that the condition of the virtual object is within a range of conditions from not damaged to not usable, and
the condition of the virtual object is rendered by graphically depicting the virtual object with an graphical representation having graphical damage characteristics corresponding to the condition information of the virtual object.

13. The method of claim 12, wherein:
the virtual object is manipulatable within the virtual world environment independent of any manipulation of the real world object other than the presence of the real world object being present within the detection area, the virtual object is manipulatable within the virtual world environment to interact with other virtual objects within the virtual world environment, the condition of the virtual object changes according to interactions of the virtual object with other virtual objects within the virtual world environment independent of a condition of the real world object, and the rendering of the virtual object changes in accordance with the changes of the condition of the virtual object as the virtual object interacts with the other virtual objects within the virtual world environment to graphically depict a change in damage sustained by the virtual object as a result of the interactions with the other virtual objects.

14. The method of claim 1, wherein:
the virtual object is rendered in the virtual world environment in relation to an avatar, associated with the user, and other virtual objects associated with the avatar in the virtual world environment, and the virtual object is rendered in relation to the avatar and the other virtual world objects in a manner consistent with a use of the virtual object if the virtual object, the avatar, and the other virtual objects were real world objects present in the real world.

15. The method of claim 1, wherein rendering the virtual object comprises:
disabling rendering of the virtual object corresponding to the real world object if the condition information meets a predetermined criteria indicating that the virtual object is not usable by the user within the virtual world environment.

16. The method of claim 1, wherein rendering the virtual object comprises equipping a virtual character representing the user in the virtual world with a virtual object corresponding to the real world object such that the virtual character utilizes the virtual object within the virtual world environment.

17. The method of claim 16, wherein the virtual object is rendered in relation to the virtual character such that the virtual object appears to be equipped by the virtual character in a similar manner as a corresponding real world object would be equipped by the user.

18. An apparatus, comprising:
a processor; and
a memory coupled to the processor, wherein the memory comprises instructions which, when executed by the processor, cause the processor to:
detect a presence of a real world object within a detection area of a detection device;
retrieve, from a storage device associated with the data processing system, virtual object characteristic information corresponding to the real world object in response to detecting the presence of the real world object; and
generate a virtual object in a virtual world environment rendered in the data processing system based on the virtual object characteristic information;
virtual object characteristic information further comprises:
retrieving virtual object condition information corresponding to the identifier information from a storage device associated with the data processing system; and
rendering the virtual object such that the virtual object has a condition corresponding to the virtual object condition information, wherein:
the virtual object condition information is virtual object condition information stored in the storage device during a previous user session with the data processing system and corresponds to a last condition of the virtual object in the virtual world during the previous user session, and updated virtual object condition information corresponding to a last condition of the virtual object at the end of a current user session is maintained in the storage device between user sessions with the data processing system such that when the real world object is again placed in the detection area of the detection device during a subsequent session with the data processing system, the stored updated virtual object condition information, corresponding to the last condition of the virtual object in the virtual world during the current user session, is retrieved and used to render the virtual object as having a condition corresponding to the stored updated virtual object condition information, in the subsequent user session.

19. A computer program product comprising a non-transitory computer recordable medium having a computer readable program recorded thereon, wherein the computer readable program, when executed on a computing device, causes the computing device to:

detect a presence of a real world object within a detection area of a detection device;

retrieve, from a storage device associated with the data processing system, virtual object characteristic information corresponding to the real world object in response to detecting the presence of the real world object; and generate a virtual object in a virtual world environment rendered in the data processing system based on the virtual object characteristic information;

wherein virtual object characteristic information further comprises:

retrieving virtual object condition information corresponding to the identifier information from a storage device associated with the data processing system; and rendering the virtual object such that the virtual object has a condition corresponding to the virtual object condition information, wherein:

the virtual object condition information is virtual object condition information stored in the storage device during a previous user session with the data processing system and corresponds to a last condition of the virtual object in the virtual world during the previous user session, and updated virtual object condition information corresponding to a last condition of the virtual object at the end of a current user session is maintained in the storage device between user sessions with the data processing system such that when the real world object is again placed in the detection area of the detection device during a subsequent session with the data processing system, the stored updated virtual object condition information, corresponding to the last condition of the virtual object in the virtual world during the current user session, is retrieved and used to render the virtual object as having a condition corresponding to the stored updated virtual object condition information, in the subsequent user session.

* * * * *